United States Patent [19]

Smith et al.

[11] Patent Number: 4,547,645

[45] Date of Patent: Oct. 15, 1985

[54] MATERIAL HANDLING METHOD AND APPARATUS THEREFOR

[75] Inventors: Robert P. Smith, Crystal Lake; William S. Gillespie, Barrington; Hal L. Inglis, Fox River Grove; Donald B. Hoyne, Cary, all of Ill.

[73] Assignee: American Can Company, Greenwich, Conn.

[21] Appl. No.: 462,912

[22] Filed: Feb. 1, 1983

[51] Int. Cl.[4] .............................................. H05B 6/06
[52] U.S. Cl. ............................ 219/10.67; 219/10.43; 219/10.53; 219/10.71; 219/10.73; 198/403; 198/459; 198/420
[58] Field of Search ............... 219/10.53, 10.43, 10.41, 219/10.67, 10.71, 10.73; 414/222, 223, 225, 786; 228/47; 29/773, 785, 792; 413/3; 445/71; 198/408, 377, 803, 339, 459, 420; 156/423, 366

[56] References Cited

U.S. PATENT DOCUMENTS

| | | | |
|---|---|---|---|
| 2,561,404 | 7/1951 | Nordquist | 198/403 X |
| 2,874,701 | 2/1959 | Stelzer | 198/420 |
| 3,208,602 | 9/1965 | Laidig et al. | 198/339 |
| 3,337,934 | 8/1967 | Jefferies | 29/785 X |
| 3,461,535 | 8/1969 | Avery, Jr. et al. | 29/785 X |
| 3,490,575 | 1/1970 | Herrman | 198/377 |
| 3,601,242 | 8/1971 | Connor et al. | 198/459 |
| 3,724,339 | 4/1973 | Metzinger et al. | 29/785 X |
| 3,798,736 | 3/1974 | Gibbons et al. | 29/711 X |
| 3,802,050 | 4/1975 | Verhoest | 29/511 X |
| 4,152,566 | 5/1979 | Mägerle | 219/10.53 |
| 4,323,748 | 4/1982 | Likins | 219/10.71 |
| 4,441,955 | 4/1984 | Richardson et al. | 156/423 |

Primary Examiner—Roy N. Envall, Jr.
Assistant Examiner—M. M. Lateef
Attorney, Agent, or Firm—Stuart S. Bowie; Douglas W. Wyatt

[57] ABSTRACT

A method and apparatus for processing of workpieces comprising the steps of continuously transferring the workpieces to and fro among a plurality of rotating members, wherein each member carries a plurality of sets of work stations. Workpieces, such as precut tubular sleeves, and tube heads, are sealed to form containers, utilizing continuously rotating turrets and cooperating rotating members designed to produce such containers efficiently and at high rate of production.

33 Claims, 10 Drawing Figures

MATERIAL HANDLING METHOD AND APPARATUS THEREFOR

FIELD OF INVENTION

This invention relates to material handling method and apparatus and is particularly related to a continuous method of, and apparatus for, forming so-called dispensing containers by joining a headpiece to a tubular member.

In one aspect, the present invention is concerned with the assembling of separate workpieces utilizing continuously rotating turrets and cooperating rotary transfer wheels to effect continuous and efficient transport of the workpieces and performing specified functions at a plurality of work stations on the turret.

Another aspect of this invention involves the heading of tubular members (sleeves) utilizing continuously rotating turrets and cooperating rotary transfer wheels to sequentially transport the sleeves and the headpieces by a series of continuous operations designed to make dispensing containers (e.g., toothpaste tubes) efficiently and at high rate of production.

In another aspect of this invention, the union of the workpieces (e.g., joinder of a headpiece to a sleeve) is effected by an improved power transfer system utilizing a unique induction welding method and apparatus designed to enhance the quality of the containers and the speed with which they can be produced.

BACKGROUND OF THE INVENTION

Transport and material handling systems have been used in many industrial operations for moving various articles through successive stages in a manufacturing process. For example, U.S. Pat. No. 3,490,575 issued to Thomas R. Herrmann on Jan. 20, 1970 describes a system for handling articles through a predetermined progression of stations or locations on a closed path utilizing a rotary transport system. However, in the transport device described in this patent, and in similar prior art devices involving the use of rotary turrets, the turrets are usually fitted with a single set of work stations such that during each revolution or cycle, only one function is performed on the turret. Therefore, in order to perform additional work functions, the workpiece must be transferred to a different turret for each succeeding function whenever a series of functions must be performed. Consequently, the resulting operation will not only become inefficient, but expensive as well.

U.S. Pat. No. 3,802,050 issued to George Verhoest on Apr. 9, 1974 also describes a rotary transfer apparatus designed especially for the manufacture of dry cells. This patent, however, is also typical of the prior art devices employing rotary turrets capable of performing a limited function on the workpieces on each turret.

Other patents of interest include U.S. Pat. Nos. 2,561,404; 2,874,701; 3,208,602; 3,461,535; 3,601,242 and 3,798,736.

So far as it is known, none of the devices disclosed in the prior art patents can be utilized efficiently in view of their inherent limitation as to their capabilities of carrying out a limited function on each turret.

Accordingly, it is an object of the present invention to provide an improved material handling system comprising turrets and cooperating transfer wheels in which more than one function can be performed continuously on each turret.

It is a further object of this invention to provide an efficient method and apparatus for the transport and assembly of workpieces continuously and at high rates of production.

It is also an object of the present invention to provide such apparatus and method which substantially reduces the size, number and thus the cost of machinery required in such operations and which requires less tooling, machinery and factory space.

The term "efficient" is intended to indicate that, by virtue of the unique design of the apparatus and the method of this invention, the various workpieces carried by the turrets are utilized to process work for a maximum interval during a single revolution of a given turret with a minimum of idle time at each work station. For example, the apparatus and the method of the present invention facilitates the location of at least two groups or sets of work stations on each of at least two turrets with the result that two different fabricating or processing steps are susceptible of performance in each turret virtually simultaneously as the turrets rotate and cooperate with associated transfer wheels.

The foregoing and other objects and features of the present invention will become more apparent from the following detailed description of the invention and the accompanying drawings.

DETAILED DESCRIPTION OF THE DIFFERENT EMBODIMENTS OF THE INVENTION

Figure 2:
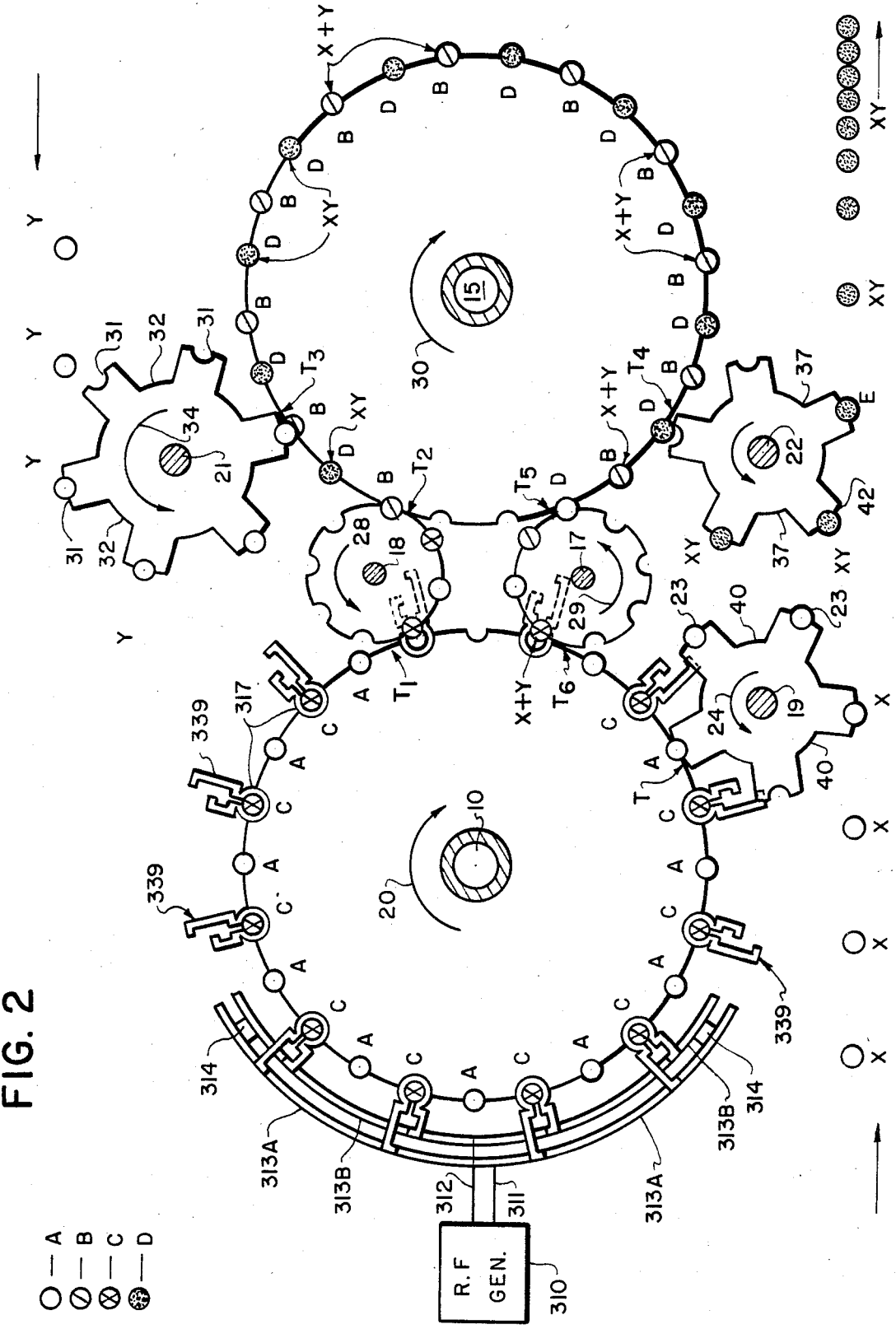
FIG. 2 is a simplified schematic illustration of the apparatus of this invention comprising turrets and cooperating transfer wheels and feed wheels used in the practice of the present invention, demonstrating the basic principles of its operation.

Referring first to FIG. 2 of the drawings, the reference numerals 10 and 15 denote rotary members or rotary turrets driven by gearing (not shown) in the direction of the arrows labelled 20 and 30 each having two sets or groups of work holders or work stations indicated generally by the reference letters A and C (turret 10), and B and D (turret 15).

It must be noted that the work performed in the holders of a given group or set is different from the work performed in other groups or sets. In addition, it is to be noted that the work in all cases is performed as the turrets 10 and 15 rotate continuously. Furthermore, it is entirely within the contemplation of the invention that turrets such as turrets 10 and 15 may carry more than two sets of work holders as considerations of economy, space, work requirements and good engineering principles dictate. Referring again to FIG. 2, reference numerals 17 and 18 designate transfer wheels which cooperate with the turrets 10 and 15 to shift mandrels to and fro from one turret to the other and from one set of work stations to the other set of work stations. Also feed wheels 19 and 21 cooperate with tureets 10 and 15, respectively, to feed workpieces (designated by the letters X and Y) for processing at specific sets of work holders or work stations of the turrets 10 and 15.

Discharge wheel 22 cooperates with turret 15 to receive and advance the finished product indicated by the letters XY to a discarge conveyor (not shown).

In general, the material handling method of the present invention is practiced in the following fashion:

Each workpiece X is advanced by a conveyor (not shown) to feed wheel 19 where each piece X is received and grasped individually as by magnetism, vacuum or other gripper device in work holders 23—23 as the feed wheel rotates in the direction shown by the arrow 24 in synchronism with rotary turret 10. In timed sequence, each workpiece X is released at tangent point T and is grasped by gripper devices at work holder at work station of the set of work stations indicated generally by the reference numeral A as the turret 10 and the feed wheel 19 rotate in unison.

It is to be understood that the workpieces X are fed continuously and are transferred at tangent point T continuously.

As the workpieces X are carried about by turret 10 (in the direction shown by the arrow 20), they are processed as by assembly, boring, burnishing or heat treating as a schedule of work functions requires. When the processed workpiece X arrives at tangent point $T_1$ it is released to transfer wheel 18 and thereafter is rotated in the direction of the arrow 28 to tangent Point $T_2$.

At tangent point $T_2$ each workpiece X is released from transfer wheel 18, and is placed in work station B of turret 15 and is carried about by turret 15 in the direction shown by the arrow 30 to tangent point $T_3$.

While piece parts X are being received, processed and transferred, feedwheel 21 is receiving piece parts Y advanced by a conveyor (not shown) and grasped individually in gripper devices 31—31 of feed wheel 21.

As the piece parts Y are carried about by feed wheel 21, in the direction of the arrow labelled 34, the individual parts X and the individual parts Y are registered, or aligned with one another at tangent point $T_3$. Thus, at point $T_3$ each piece part Y is released to turret 15 and thereafter piece parts X and Y are united as an assembly as they are carried about by turret 15 in work station B. The assemblies, identified by the couple X+Y, are thereafter processed as desired as they are carried by turret 15 in the direction of the arrow 30. When the assemblies of workpieces X+Y reach tangent point $T_5$ they are released into transfer wheel 17, rotating in the direction of the arrow 29.

It must be noted that at this stage discharge wheel 22 ignores the passage of workpiece assemblies X+Y as they pass tangent point $T_4$. This is so because discharge wheel 22 is formed with gaps, voids or cutouts 37—37 which provide clearance for the uninterrupted passage of those assemblies.

The couples or assemblies X+Y are next carried by transfer wheel 17 to tangent point $T_6$ where they are released and immediately grasped by gripper devices associated with the group of work stations C. The assemblies at stations C while carried about by turret 10 (in the second work cycle on the turret 10) are processed as required while moving from tangent point $T_6$ to tangent point $T_1$. This passage of assemblies at stations C is ignored by feed wheel 19 in that cutouts 40—40 provide clearance for uninterrupted passage in the same manner as previously described with respect to discharge wheel 22.

From point $T_1$ the processed assemblies now identified as XY are carried to point $T_2$ by transfer wheel 18 where they are released and grasped by gripper devices associated with the set of work stations labelled D on turret 15. From point $T_2$ the assemblies XY are further processed as they progress around to point $T_4$. The assemblies XY carried by turret 15 in work stations D are ignored by feed wheel 21 in that cutouts 32—32 of feed wheel 21 provide adequate clearance for the uninterrupted passage of those assemblies.

As the assemblies XY progress to point $T_4$ further processing occurs. At point $T_4$ the assemblies are released and grasped by gripper devices 42—42 of discharge wheel 22. The wheel 22 carries the fully processed assemblies XY to the station E where they are released to and carried away by a conveyor (not shown).

It is apparent from the foregoing description that a wide variety of permutations and combinations of turrets, transfer means, work stations, feed means and discharge means may be devised without departing from the spirit and scope of the present invention. For example, each turret may have two or more sets of work stations, two or more feed means, and two or more discharge stations and work in process may be transferred to and fro from one turret to a second turret and to a third turret as considerations of space, complexity of processing and economy dictate.

Furthermore, the novel method steps of the invention may be practiced by mounting each workpiece X and/or Y (FIG. 2) upon a work holder or mandrel where the mandrel serves as the instrumentality which transports workpieces individually or as an assembly to and fro from one turret to another until the workpieces are finally removed from the mandrel as they approach tangent point $T_4$, whereupon the mandrel is retained upon turret 15 and is returned by transfer wheel 17 to tangent point T poised to receive a fresh piece part from feed wheel 19 for mounting upon the mandrel as the mandrel progresses from point T to point $T_1$.

It is to be further understood that the various turrets, feed wheels, transfer wheels and the discharge wheel are suitably timed, synchronized and driven by gears or any suitable means to facilitate the practice of the method steps of the present invention.

Since the turrets 10 and 15 have multiple work stations associated therewith, it is apparent from the present disclosure that there must be an even number of work stations and odd number of mandrels associated with turrets. Thus, for example, if turret 10 contained eight working stations, the sequence of operations may be expressed as A, C, A, C, A, C, A, C.

Also, where the turret has an even number of work stations, an odd number of mandrels must be used, otherwise the mandrels which were in an A station during the first cycle of the turret will return to an A station during the second cycle of the turret.

FIG. 2 represents a simplified schematic layout of an embodiment of the apparatus and method which illustrate the broad principles of this invention for handling and assembling of various workpieces. In one specific aspect of the present invention, the making of dispensing containers is illustrated with reference to FIGS. 1 and 3.

Figure 1:
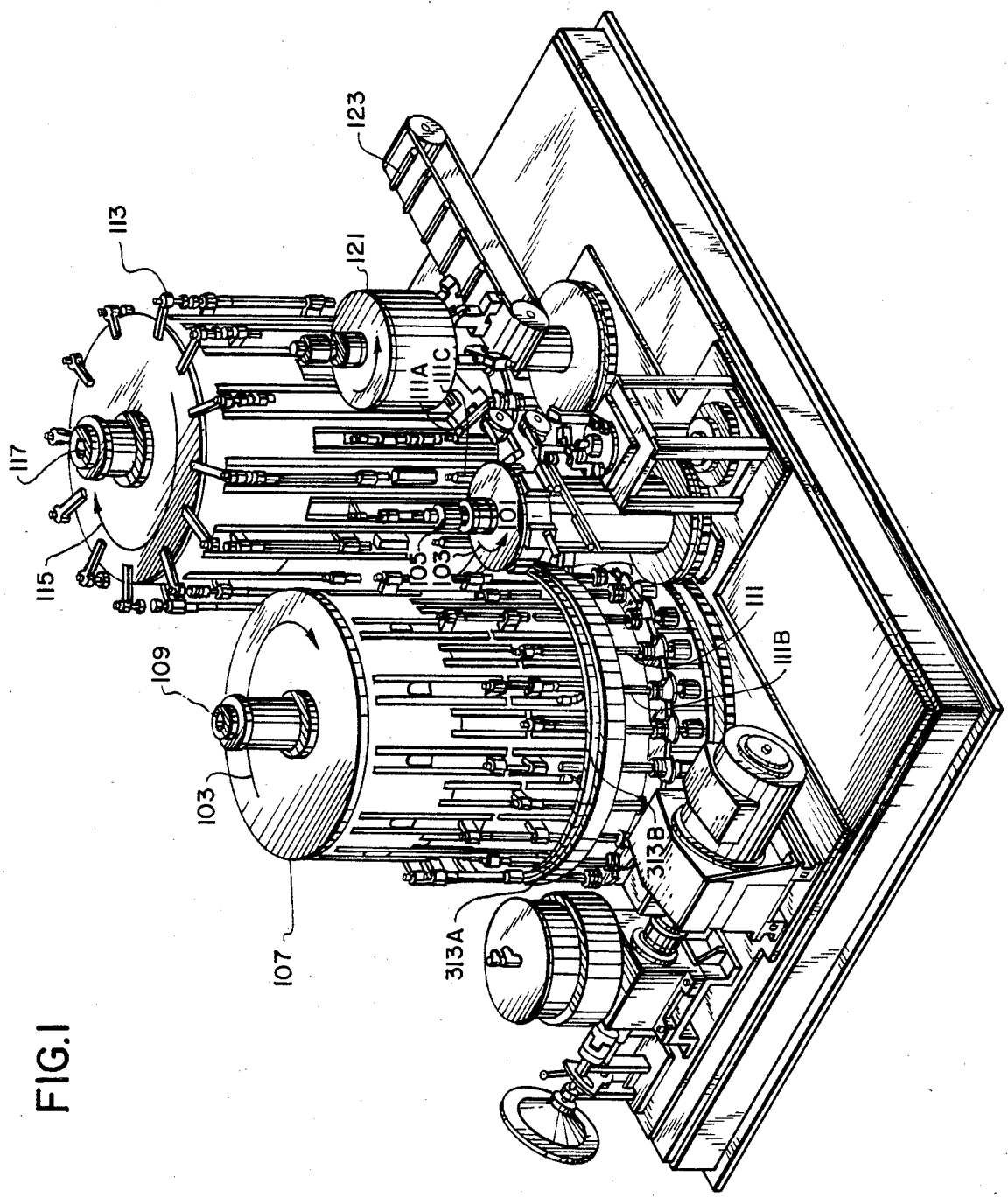
FIG. 1 is an isometric view of an apparatus embodying the principals of the present invention with emphasis on making of dispensing containers by the heading of tubular sleeves.
Figure 3:
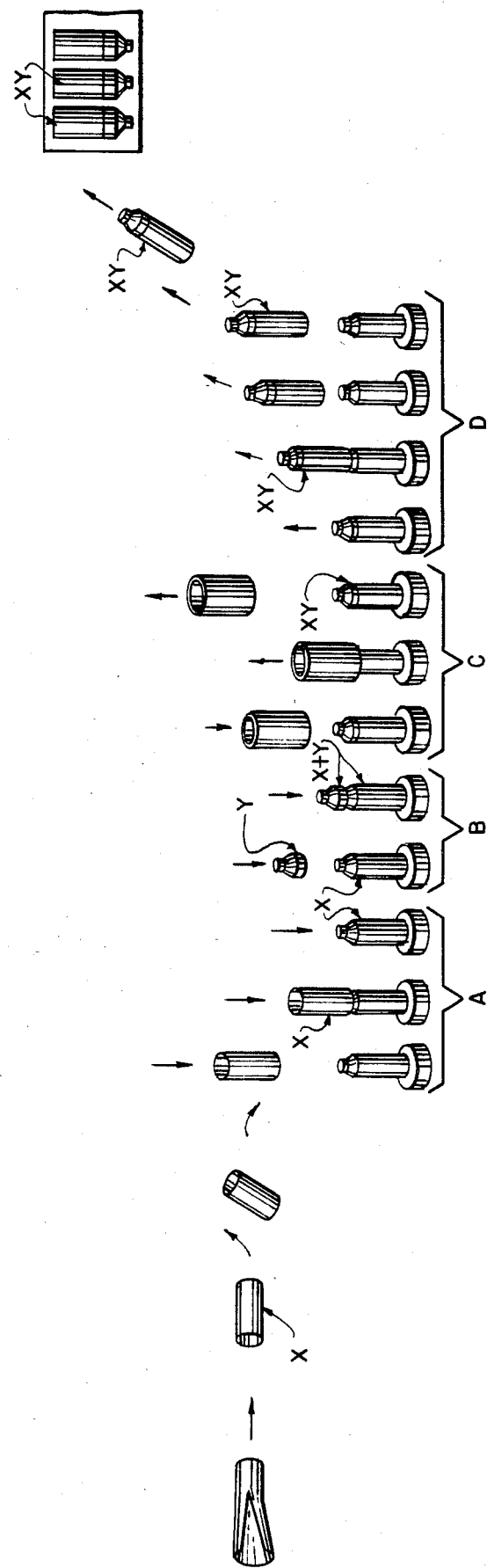
FIG. 3 is a sequential schematic diagram illustrating the principal steps involved in making the dispensing containers with reference to the corresponding stations or locations in FIG. 2.

Thus referring to FIGS. 1 and 3, a flat web stock is first converted into a seamed tube which is then cut to the desired length forming the sleeve (component X) of the finished dispensing container XY.

The precut sleeves X are conveyed by means of a conveyor belt (not shown) wherefrom they are fed in timed sequence to an input turret or feed wheel 101 (FIG. 1) rotating in the direction of the arrow 103 about its central axis 105. The tube sleeves X are grasped, one by one, by vacuum cups (not shown) or any other suitable means, whereby the sleeves are rotated 90 degrees, from their horizontal positions on the input conveyor to vertical positions, before they are transferred to a primary turret 107 rotating about a central axis 109 in the direction 103, wherein the sleeves are engaged by every other mandrel 111 during the first revolution or cycle of the primary turret 107. The mandrels 111 are cicrumferentially disposed about the primary turret 107 as shown in FIG. 1.

It is to be noted that the conveyor means, the feed wheel 101 and the primary turret 107 are synchronized so that the sleeves A are transported in timed sequence throughout this operation.

Next, the mandrels containing the sleeves are transferred from the primary turret 107 to a secondary turret 113 via a transfer wheel (not shown) rotating in the direction of the arrow 115 about its central axis 117. As the secondary turret 113 rotates, preformed headpieces Y which have been previously capped and which usually have inserts placed therein are fed from a head feed (not shown) by a suitable conveyor means (not shown) to the secondary turret 113 continuously and in timed sequence with the speed of rotation of the sleeve-containing mandrel. On the secondary turret 113, the heads Y are placed on the top of the same mandrels which received the sleeves X in turret 107.

With the headpieces Y now in position over the sleeve-containing mandrels 111, the mandrels 111 now identified as 111A, are transferred back to the primary turret 107, via a transfer wheel (not shown), feeding into the alternate pockets thereof which were not previously used during the loading of the tureet 107 with the sleeve from the feed wheel 101. The mandrels 111A returning to the turret 107 are identified as 111B. As the primary turret 107 rotates, each sleeve is biased into positioned relation with respect to its associated headpiece and the two components are then heat sealed to form the finished container as the turret 107 rotates during its second cycle. The heat sealing or welding systems used to seal the headpiece to the sleeve are more particularly described hereinafter with reference to FIGS. 4-9.

The finished tubes are next transferred from the primary turret 107 to the secondary turret 113 where they are engaged into the alternate pockets or stations not previously used during the first cycle of this turret. At this stage, the mandrels are identified as 11C. As the secondary turret 113 rotates during its second cycle, the finished tubes are disengaged therefrom and are grasped by vacuum cups or other suitable means in the output turret or output feed wheel 121. The vacuum cups rotate the finished tubes 90 degrees (from vertical to horizontal position) and the finished tubes are then conveyed by the output conveyor belt 123 to a packaging station (not shown).

It must be noted that the primary and secondary turrets, their respective cooperating feed wheels or means and the input and output conveyors are all synchronized to perform the entire heading operation and the formation of the finished tubes efficiently, continuously and at a high rate of production to satisfy the ever increasing demand for high speed rates of production of such dispensing containers.

Figure 4:
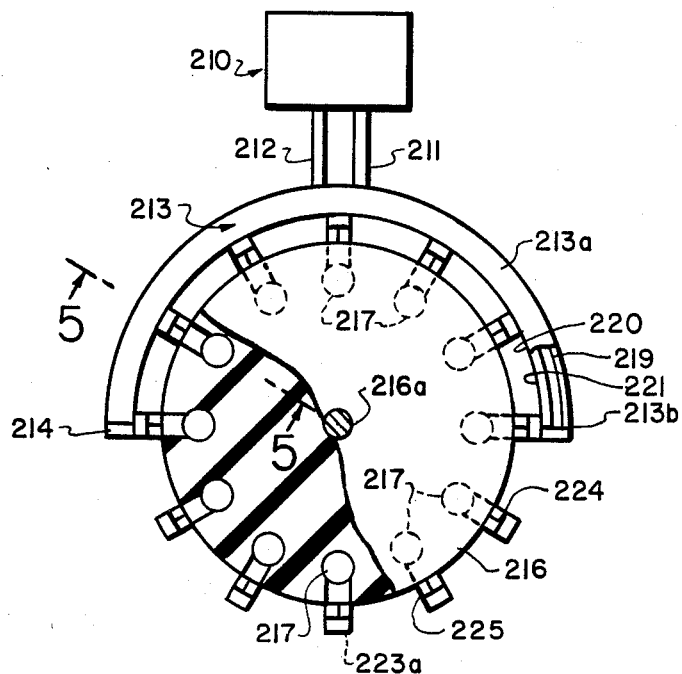
FIG. 4 is an ortrographic view illustrating a power supply assembly which is useful for the joinder of workpieces, e.g., for heading the tubes to make dispensing containers.
Figure 5:
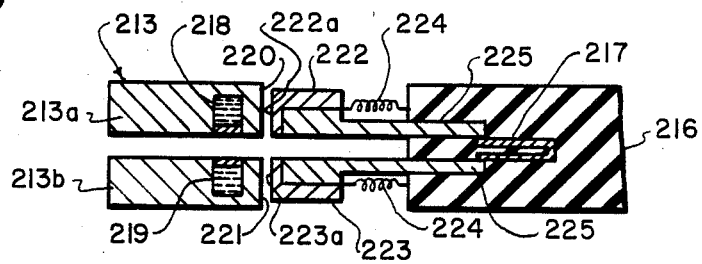
FIG. 5 is a cross section taken along the line 5—5 of FIG. 4.

As it was previously mentioned in connection with making of finished tubes, the headpiece and the sleeves may be heat sealed by induction heating from a radio-frequency energy supply source. One such power supply system, which is illustrated in FIGS. 4 and 5, and described herein below, is also disclosed in co-pending, commonly assigned application of Robert W. Likins, filed Apr. 11, 1980, the disclosure of which is fully incorporated herein by reference.

Thus referring to FIG. 4, there is shown a power supply source such as an induction heating generator 210 for providing RF energy at low voltage (200 to 1,000 open circuit voltage), at high frequency (300 to 600 kHz) and at high current (75 to 200 amp.). The generator 210 transmits power along a pair of upper and lower supply bus connections 211 and 212 to the loop generally designated as 213 which is comprised of two semi-circular parallel loop busses 213a and 213b.

The busses 211 and 212 and the loop bus 213 are fabricated from a suitable conductor such as copper and may be made hollow to permit passage of a coolant (e.g., water) therethrough in order to maintain the operating temperature at a reasonable level notwithstanding the passage of high currents.

At their respective ends, the loop busses 213a and 213b are provided with shorting plates 214 which act to provide a shunted path for the ends of each loop. The shorting plates 214 are usually also made of a suitable metallic conductor such as copper and may similarly include cooling passages, if desired. The shorting plates 214 are affixed to the ends of the loop busses 213a and 213b by a bolt to insure secure engagement thereto and intimate contact therewith.

In FIG. 4, the top surfaces 220, 221 (shown in FIG. 5) are used for contacting the rotary brushes carried by a rotating turret designated as 216 although, and with reference to FIG. 1, this may be a turret such as the primary turret 107. However, for convenience of understanding of the operation of the induction welding system, it will be described herein with reference to the rotating turret 216.

The rotating turret 216 rotates about its central axis 216a and rotatably carries a plurality of spaced apart heating coils 217 which are identical in design. As the heating coils 217 rotate with the turret, they engage with the loop busses 213a and 213b so that power is transferred by each loop bus to a side of each coil.

Figure 6:
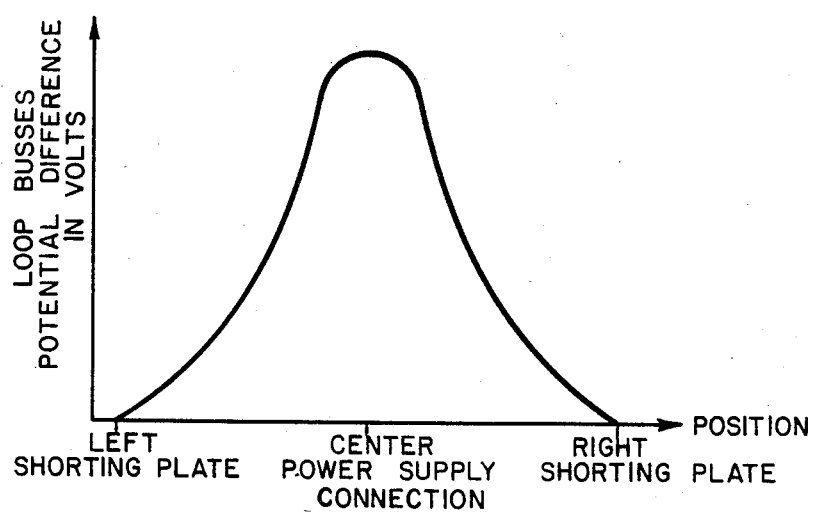
FIG. 6 is voltage versus position graph depicting the varying potential difference between the legs of the loop shown in FIG. 4 at various locations from end to end along the loop.

FIG. 6 shows a voltage versus position graph having the variation of potential difference along the loop busses on the vertical axis and the distance or position along the loop bus from the left side shorting plate to the right side shorting plate on the horizontal axis. As is apparent from this graph, the potential difference of the voltage measured between the loop busses 213a and b increases as location becomes closer to the center of the power supply connections, increasing to a maximum at the point of connection, and conversely, the potential difference diminishes between the loop busses 213a and b as the location is nearer to the shorting plates 214. It can be appreciated that the power available to a work coil 217 as it engages the loop busses 213a and b beyond a shorting plate 214 will not be transferred with arcing because the potential difference at the shorting plate 214 is zero. Consequently, as the contact brushes of the work coil 217 engage or disengage, the loop busses 213a and b will not arc because the power transferred to the work coil at that point is zero and increases as a function of the distance traversed along the loop busses 213a and b toward the contact supply busses 211 and 212 in accordance with the graph of FIG. 6.

FIG. 5 shows a cross sectional view of a contact brush arrangement for work coil 217. As shown in this figure, the loop busses 213a and b include passages 218 and 219 for carrying a cooling fluid, usually water. The cross-section of the loop bus 213 is generally rectangular, but any suitable shape which is convenient to manufacture can be used.

The smaller inwardly disposed faces of the rectangular loop bus cross-section are designated 220 and 221 for the loop busses 213a and 213b, respectively. These faces 220 and 221 form inwardly with respect to the semi-circle formed by the loop bus 213 and are generally vertical surfaces. It is these faces 220 and 221 which are used to supply the power to the work coil 217.

In FIG. 5, the work coil 217 is shown connected to a pair of movable contact brushes 222 and 223 designed to ride against surfaces 220 and 221, respectively. Each brush 222 or 223 has a contact face 222a or 223a which is shaped and positioned to bear against surfaces 220 or 221, respectively. The brushes are mounted for movement and are biased toward surfaces 220 and 221 as shown schematically in FIG. 5. Non-metallic springs 224 are positioned between the work turret 216 and the contact brushes 222 and 223. Each contact brush is carried by a suitable support and connector bus 225 which permits the contact brush 222 and 223 to slide therein toward the faces 220 or 221, respectively, of the loop busses 213a or 213b due to the urging of its spring 224. The connector busses 225 are each connected to a leg of a work coil 217.

Thus, power is transmitted from loop bus 213a through surface 220 to the brush 222 via surface 222a, then to the connector bus 225 which carries it to one side of work coil 217 and therethrough to the other side of work coil 217 across the other connector bus 225 through brush 223 and its contact face 223a which engages with surface 221 of the loop bus 213b for applying a working load to the generator 210.

As the turret 216 rotates, a series of work coils 217 are consecutively brought into engagement with the loop bus 213, one after the other, and the power transmitted to each work coil 217 builds up in accordance with the motion of the turret 216 as it rotates bout its axis 216a. Thus, as the coils 217 approach the connecting supply bus 211 and 212, the power transmitted to each work coil 217 increases to a maximum and as the turret 216 moves that particular work coil 217 past the center of the loop bus 213, the power transmitted will begin to diminish as the coil 217 continues to move toward the end of the loop bus.

Figure 7:
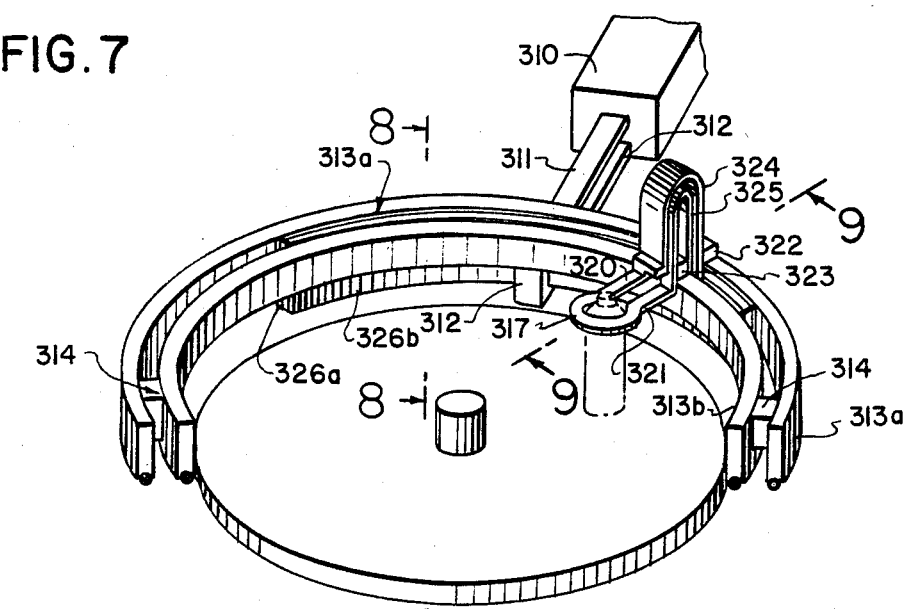
FIG. 7 is a perspective view of an induction welding system which is useful for welding of workpieces, e.g., a tube head onto a tubular sleeve.
Figure 8:
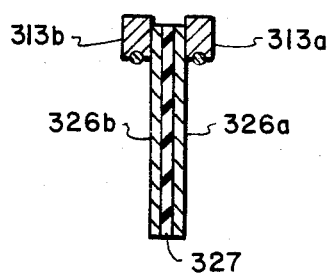
FIG. 8 is a vertical sectional view taken along the line 8—8 of the apparatus shown in FIG. 7.
Figure 9:
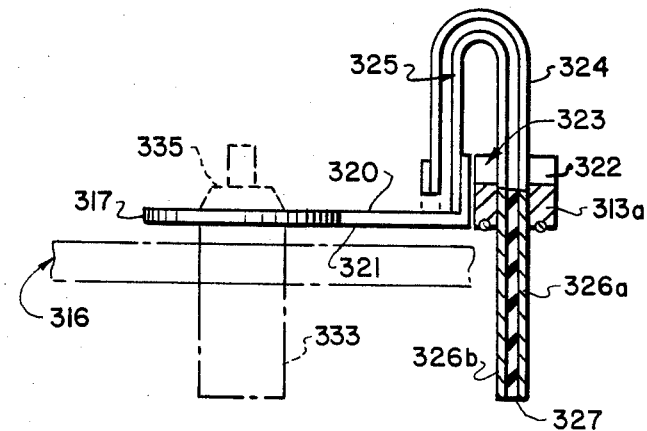
FIG. 9 is another sectional view taken along the line 9—9 of FIG. 7.

An improved induction heating system is illustrated in FIGS. 7–9. Thus, referring to these figures, and first to FIG. 7, there is shown a radio-frequency generator 310 from which power is transmitted through a pair of capacitor leads or terminals 311 and 312 to a pair of stationary commutator rails; and outer commutator rail 313A and an inner commutator rail 313B as hereinafter described.

The stationary commutator rails 313A and 313B are generally curved rectangular metallic conductors such as copper, and are substantially concentric to one another. These commutator rails may be made hollow to permit the passage of cooling fluid (e.g., water) to control the operating temperature at the desired level.

Power from the generator 310 is transmitted to the inner commutator rail 313B via the conductive terminal 312 and to outer commutator rail 313A via the conductive terminal 311. The conductive terminals 311 and 312 are separated by an insulating layer, the details of which are described hereinafter.

In the embodiment illustrated in FIGS. 7–9, a pair of shorting blocks or plates 314 are secured to each end of the commutator rails 313A and 313B. The shorting blocks 314 may also be made of a suitable conductor such as copper and their provision results in maximum voltage at the section where the conductive terminals 311 and 312 are connected to the respective commutator rails 313A and 313B, and substantially zero potential difference at the shorted ends of the commutator rails.

The commutator rails 313A and 313B may be fixedly mounted about a rotatable turret 316 which carries one or more induction heating or work coils 317, each coil being preferably a single generally circular loop. The turret 316 may be a turret such as the primary turret 107 shown in the apparatus of FIG. 1, but for convenience of illustration, it will be described separately in conjunction with the induction heating system of FIG. 7.

Referring to FIG. 9, each work coil 317 is suitably mounted about the juncture of a tube sleeve 333 and a tube head 335 to provide the induction field necessary for heating and welding the tube head to the tube sleeve to form a unitary container. The tube sleeve 333 and tube head 335 may correspond to the tube sleeve X and tube head Y of FIG. 3 which are engaged by the mandrels 111 on the primary turret 107 of FIG. 1.

Referring back to FIG. 7, energy is transmitted from the commutator rails to the work coil 317 by means of brushes which are slideably mounted on the rails and are conductively connected to the work coil 317 as more fully explained hereinafter.

Thus, each work coil 317 is connected by a conductive terminal and one leg 324 of a generally flexible member to an outer commutator brush 332 which is slideably mounted to ride on and along the upper surface of the outer commutator rail 313A. An inner commutator brush 323 is slideably mounted to ride on and along the inner commutator rail 313B and is conductively connected through the other leg 325 of the flexible member and conductive terminal to the work coil 317.

The work coil 317, connective terminals or busses 320 and 321, the arch-shaped flexible members 324, 325 and the brushes 322, 323 are all preferably made of copper, however they may be fabricated from other suitable low resistance conductors, if desired.

Although one work coil is shown in FIG. 7 for the sake of simplicity of illustration, several such work coils may be spaced at equal distances with their corresponding connective members disposed about the turret 316.

It must be noted that in the embodiment illustrated in FIGS. 7-9, the commutator rails 313A and 313B are fixedly mounted about the rotating work table and that the conductive brushes are mounted on the rotating work table and are adapted to ride upon the fixed commutator rails.

Again referring to FIGS. 7-9, there is shown a pair of capacitor fin plates 326A and 326B which are substantially equal in thickness and length and are separated by an electrically insulating layer 327 (see FIG. 8). The capacitor fin plate 326A is attached to the outer commutator rail 313A along a portion thereof.

The capacitor fin plates 326A and 326B are shaped for conformal attachment to the generally circular commutator rails. Power from the generator 310 is transmitted by the conductive terminals 311 and 312 to the capacitor fin plates 326A and 326B, respectively, and hence to the commutator rails.

The induction welding system shown in FIGS. 7-9 comprises three features; the section of the rails which contains the capacitor fin plates 326A and 326B, the segment of the rails disposed between said capacitor plates and the shorting blocks 314 and the segment of the rails extending beyond the ends of said shorting blocks. Each of these segments serves an important function in the operation of this induction welding system.

Figure 10:
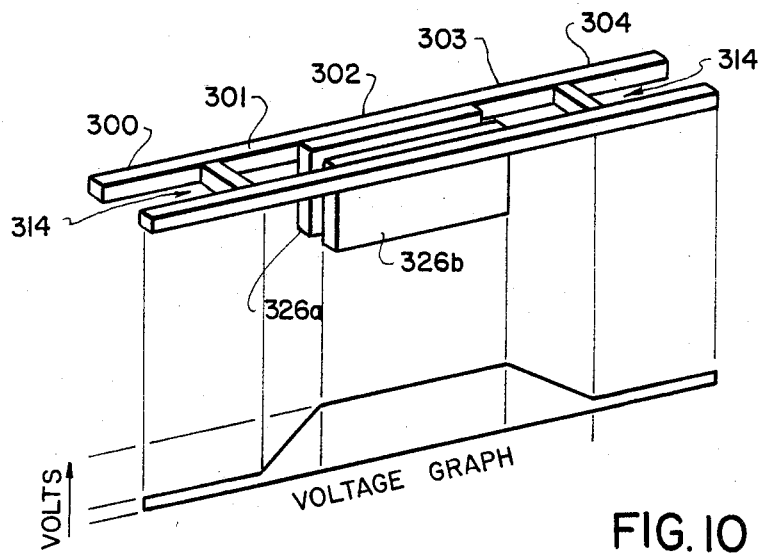
FIG. 10 is a voltage versus position graph showing the potential difference at varying distances across the commutator rails shown in FIG. 7 with the rails illustrated in superimposed position for better understanding of this graph.

Thus referring to FIG. 10, in the area 302, defined as the area where the capacitor plates 326A and 326B are mounted on the rails, the circuit is primarily capacitive and the voltage is high and essentially constant. In the areas 301 and 303, defined, respectively, as the area between each capacitor plate and each of the shorting blocks 314, this circuit is primarily inductive, thus allowing the voltage to drop at a substantially uniform rate to substantially zero voltage at the shorting blocks. Beyond each shorting block, in the areas defined by 300 and 304, the voltage remains substantially zero.

Referring once again to FIG. 10, under normal operation, the brushes 322, 323 contact the commutator rails 313A and 313B in area 300 where the voltage is essentially zero. This enables the brushes to contact the rails without destructive arcing and damage to the brushes or the rails. The brushes then slide along past the shorting blocks and the area designated as 301 where the voltage rises at a substantially uniform rate until the brushes reach the capacitor plates 326A and 326B, where the voltage levels off and remains essentially constant at maximum value. As the brushes continue to slide along the rails and pass by the capacitor plates through area 303, the voltage begins to drop again until it reaches essentially zero voltage at the shorting block 314 at the other end of the commutator rails. As the brushes pass beyond the shorting block into area 304, they are removed from the rails without arcing and with no damage to the brushes or the rails.

In the embodiment illustrated in FIGS. 7-10, the provision of the shorting blocks or plates at the ends of the commutator rails prevents, or substantially minimizes, destructive sparking since the work coil brushes make and break electrical contact when passing onto and off the commutator rails. In addition, as it was previously mentioned, electrical shorting of the commutator rails in connection with the capacitor plates result in optimum potential difference at the center of the rails, with the voltage dropping to approximately zero at the ends of the rail. If the shorting blocks are removed, voltage will be higher in the capacitor plates area and at the ends of the rails resulting in arcing as the brushes contact and leave the rails.

The circumferential lengths of the commutator rails and the lengths of the plated section of the rails in conjunction with the speed of rotation of the turret and spacing of the working coils can be adjusted to produce the desired time sequence in which the work coils are energized. The radio-frequency generator 310 may thus run continuously since the electrical shorts at the end of the rails permit the brushes to make and break contact with minimum or no sparking.

The spacing between the commutator rail extensions beyond the capacitor plates is preferably about $\frac{1}{2}$ to $\frac{5}{8}$ inch or more. If spaced closer than about $\frac{1}{2}$ inch, the impedance at the end loops will be less, the total power drain in the system will be greater and, consequently, the voltage along the capacitator plates will be diminished.

The system described in connection with FIGS. 7-9 may be used in conjunction with an indexing turret similar to the primary turret 107 in FIG. 1, wherein the brushes slide on the commutator rails singly, in pairs or more and stop at given time intervals for energizing the work coils and then move on to the next stop, and so on.

As it was previously mentioned, the induction welding system described in FIGS. 7-9 may be used in the apparatus shown in FIGS. 1 and 2 for welding or heat sealing of different workpieces such as, for example, heading of tubular sleeves. Thus, referring to FIG. 2, the commutator rails 313A and 313B are shown conformally mounted about a segment of the turret 10. Electric power from the generator 310 is transmitted to the inner commutator rail 313B by the conductive terminal 312 and to the outer commutator rail 313A by the conductive terminal 311. The commutator rails 313A, 313B connected to induction coils 317 by means of the brushes 222, 223 and the flexible connectors 339 for heat sealing of the tube head to the sleeve at the work stations C.

It may be appreciated from the foregoing detailed description that numerous changes and modification may be made in the apparatus and/or method of this invention which are obvious from the present disclosure. Such changes and modifications, however, are within the scope and contemplation of the present invention and the disclosure herein.

What is claimed is:

1. A method of processing work comprising the steps of providing at least two rotating members each having a plurality of work stations for receiving workpieces to be continuously processed, depositing sequentially and individually a first series of workpieces into a first set of work stations of a first rotating member, depositing sequentially and individually a second series of workpieces into a first set of work stations of a second rotating member, transferring sequentially and individually the first workpieces from said first rotating member to said second rotating member, providing timing and transfer means between said members to shift said first workpieces so that said first and second workpieces register with one another on said second rotating member facilitating an assembly of individual workpieces of each said series, transferrign and shifting said assemblies of first and second workpieces sequentially and individually from said second rotating member to a second set of work stations on said first rotating member for further processing, thereafter transferring and shifting said assemblies sequentially and individually from said first rotating member to a second set of work stations on said second rotating member and removing said assemblies sequentially and individually from said second rotating member.

2. The method of claim 1 where the workpieces are mounted upon a mandrel in said first rotating member and removed from said mandrel on said second rotating member.

3. The method of claim 2 in which said mandrel circulates from said first rotating member to said second rotating member and back to said first rotating member continuously.

4. The method of claim 1 in which the individual work stations of each set of work stations are sequentially spaced about the respective rotating members.

5. The method of claim 1 in which the work stations of one set of stations of a rotating member are arranged to alternate with the work stations of a second set of stations.

6. The method of claim 1 in which transfer wheels are provided for shifting workpieces from one rotating member to another rotating member.

7. The method of claim 1 in which feed wheels are provided for introducing workpieces to said rotating members.

8. The method of claim 1 in which a discharge wheel is provided for receiving finished products from said second rotating member.

9. A method of processing work comprising the steps of providing at least two rotating members each having a plurality of work stations for receiving workpieces to be continuously processed, depositing sequentially and individually a series of workpieces into a first set of work stations of a first rotating member for processing, transferring sequentially and individually said workpieces from said first rotating member to said second rotating member for further processing, providing timing and transfer means between said rotating members for shifting said workpieces so that said workpieces register with and are received by a first set of work stations on said second rotating member, after further processing transferring and shifting said registered workpieces sequentially and individually from said second rotating member to a second set of work stations on said first rotating member for still further processing, thereafter transferring and shifting said registered workpieces sequentially and individually from said first rotating member to a second set of work stations on said second rotating member for further processing and removing said assemblies sequentially and individually from said second rotating member.

10. The method of claim 9 where the work pieces are mounted upon a mandrel in said first rotating member and removed from said mandrel in said second rotating member.

11. A method of processing work comprising the steps of providing at least two rotating members each having a plurality of sets of work stations for receiving workpieces to be continuously processed, depositing sequentially and individually a series of workpieces into a first set of work stations of a first rotating member, transferring sequentially and individually said workpieces from said first rotating member to said second rotating member for further processing, providing timing and transfer means between said members for shifting said workpieces so that said workpieces register with and are received by a first set of work stations on said second rotating member, after further processing transferring and shifting said workpieces sequentially and individually to a second set of work stations on said first rotating member for additional processing, thereafter transferring and shifting said assemblies sequentially and individually to a second set of work stations on said second rotating member and thereafter transferring and shifting said workpieces to a third set of work stations on said first rotating member and transferring and shifting to a third set of work stations on said second rotating member.

12. A method of processing work comprising the steps of providing a plurality of rotating members each having a plurality of sets of work stations for receiving workpieces to be continuously processed, depositing sequentially and individually a series of workpieces into a first set of work stations of a first rotating member selected from said plurality of rotating members, automatically transferring and shifting sequentially and individually the workpieces from said first rotating member to a predetermined set of work stations of a second rotating member, thereafter transferring and shifting said workpieces sequentially and individually to a predetermined set of work sattions on a selected rotating members for further processing.

13. A method of making dispensing containers from precut tubular sleeves and preformed headpieces comprising:
  (a) continuously and sequentially feeding said precut tubular sleeves to a rotating input turret,
  (b) transferring said tubular sleeves from said input turret to a rotating primary turret having a plurality of mandrels disposed thereabout and wherein said tubular sleeves are placed on every other mandrel during the first revolutionary cycle of said primary turret,
  (c) transferring the mandrels containing said tubular sleeves from said primary turret to a secondary rotating turret wherein preformed headpieces are, continuously and in timed sequence, placed on said mandrels during the first revolutionary cycle of said secondary turret.
  (d) transferring the mandrels containing the tubular sleeves and headpieces from said secondary turret back to said primary turret wherein the tubular sleeve and the headpiece in each of said mandrels is biased in substantially contiguous relation to one another and thereafter heat sealing each headpiece to its associated tubular sleeve to form the finished container as the primary turret rotates during its second revolutionary cycle, and
  (e) transferring the finished container from said primary turret back to said secondary turret and removing the finished containers from said secondary turret during the second revolutionary cycle of said secondary turret.

14. The method of claim 13 wherein the tubular sleeves are engaged by said mandrels on a first set of work stations on said primary turret during the first cycle of said primary turret, the mandrels containing the sleeves are engaged in a first set of work stations on said secondary turret during the first cycle of said secondary turret, the mandrels containing the headpieces and the sleeves are engaged onto a second set of work stations on the primary turret different from and alternately disposed relative to the first set of work stations during the second cycle of said primary turret and the finished containers are engaged by a second set of work stations on the secondary turret different than the first set of work stations during the second cycle of the secondary turret.

15. A method as in claim 13 wherein heat sealing of each of said tubular sleeves to its respectively associated headpiece is effected by radio-frequency energy.

16. A method as in claim 14 wherein heat sealing of each of said tubular sleeves to its respectively associated headpiece is effected by radio-frequency energy.

17. An apparatus for making dispensing containers from precut tubular sleeves and preformed headpieces comprising:
(a) a first rotating member having a plurality of work stations defined by a first set of work stations and alternately disposed second set of work stations,
(b) means for sequentially depositing said tubular sleeves onto said first set of work stations,
(c) means for engaging said tubular sleeves in said first set of work stations as the first rotating member rotates during its first revolutionary cycle,
(d) means for transferring said tubular sleeve from said first rotating member to a first set of work stations in a second rotating member having a plurality of work stations defined by a first set of work stations and alternately disposed a second set of work stations,
(e) means for depositing the preformed headpieces onto said tubular sleeves as said second rotating member rotates during its first revolutionary cycle,
(f) means for transferring said assembled headpieces and tubular sleeves from said second rotating member for engagement onto said second work stations of said first rotating member,
(g) means for biasing said headpieces relative to their respective associated tubular sleeves as said first rotating member rotates during its second revolutionary cycle,
(h) heat sealing means cooperating with said first rotating member for heat sealing each headpiece to its associated tubular sleeve to form the finished containers as said first rotating member continues its second revolutionary cycle,
(i) means for transferring said finished containers from said first rotating member for engagement into the second work stations of said second rotating member as said second rotating member rotates during its second revolutionary cycle, and,
(j) means for disengaging said finished containers from said second rotating member as said second rotating member continues its second revolutionary cycle.

18. An apparatus as in claim 17 wherein the means in (d), (f) and (i) are rotating members.

19. An apparatus as in claim 17 wherein said means for engaging said tubular sleeve in said first set of work stations on said first rotating member is a plurality of mandrels.

20. An apparatus as in claim 18 wherein said means for energizing said tubular sleeve in said first set of work stations on said first rotating member is a plurality of mandrels.

21. An apparatus as in claim 17 wherein said heat sealing means is a radio-frequency energy source.

22. An apparatus as in claim 18 wherein said heat sealing means is a radio-frequency energy source.

23. An apparatus as in claim 19 wherein said heat sealing means is a radio-frequency energy source.

24. An apparatus as in claim 20 wherein said heat sealing means is a radio-frequency energy source.

25. An apparatus as in claims 17, 18, 19, 20, 21, 22, 23, or 24, wherein said heat sealing means comprises:
a first and second means operatively associated with one another for movement of at least one said means relative to the other from positions away from one another to positions in contact,
each of said means having a separated pair of surfaces positioned for rubbing engagement with each other when said means are in said contact position and one of said means having its said pair of surfaces elongated in the direction of said rubbing engagement,
a power supply connected across said elongated pair of surfaces for activation to a state of electrical potential therebetween and the other of said pair of surfaces being electrically connected in circuit with a load adapted to intermittently receive said potential,
said means with said pair of elongated surfaces being shunted at portions spaced apart from said power supply conenction, and
said means are arranged when moving away from said position to said contact position to first cross one of said shunted portions, and then said power supply connections and finally the shunted portion.

26. The apparatus of claim 25 wherein said one pair of surfaces are associated with said first means and said power supply is stationary and said other pair of surfaces are associated with said second means.

27. The apparatus of claim 25 wherein said means having elongated surfaces is connected to said power supply at one location which is most equidistant from said shunted portion.

28. The apparatus of claim 25 wherein said power connection location is disposed centrally between a pair of said shunted portions each being located most distant therefrom.

29. An apparatus as in claims 17, 18, 19, 20, 21, 22, 23 or 24, wherein said heat sealing means comprises a radio-frequency energy source, a pair of spaced apart, substantially parallel stationary commutator rails disposed about said first rotating member, at least one work coil mounted on said first rotating member, means for conductively connecting said radio-frequency energy source to said commutator rails, a pair of commutator brushes for each working coil, each of commutator brushes being slideably mounted for movement along one of said commutator rails, means for conductively connecting each of said commutator brushes to each of said work coils, means for short circuiting the respective ends of said commutator rails, and a pair of conductive substantially parallel capacitor members separated by an insulative layer each of said capacitor members being conformally attached to a portion of said commutator rails to maintain a uniform high potential difference along said portions of the rail.

30. An apparatus as in claim 27 wherein said means for short circuiting the ends of said commutator rails are shorting plates conductively connected to said rails.

31. An apparatus as in claim 30 wherein said commutator rails extend a distance greater than the length of said brushes beyond the opposite ends of said capacitor members.

32. An apparatus as in claim 31 wherein said commutator rails extend a distance greater than the length of said brushes beyond the opposite ends of said capacitor members.

33. A method of making dispensing containers from precut tubular sleeves and preformed headieces comprising:
  (a) continuously and sequentially feeding said precut tubular sleeves to a rotating input turret,
  (b) transferring said tubular sleeves from said input turret to a rotating primary turret having a plurality of mandrels disposed thereabout and wherein said tubular sleeves are placed on every other mandrel during the first revolutionary cycle of said primary turret,
  (c) transferring the mandrels containing said tubular sleeves from said primary turret to a secondary rotating turret wherein preformed headpieces are, continuously and in timed sequence, placed on said mandrels during the first revolutionary cycle of said secondary turret,
  (d) transferring the mandrels containing the tubular sleeves and headpieces from said secondary turret back to said primary turret wherein the tubular sleeve and the headpiece on each of said mandrels are biased in substantially contiguous relation to one another and thereafter heat sealing each headpiece to its associated tubular sleeve to form the finished container as the primary turret rotates during its second revolutionary cycle, said heat sealing being achieved by a radio-frequency source conductively connected to a pair of spaced apart, substantially parallel stationary commutator rails disposed about said first rotating member, at least one work coil mounted on said first rotating member, a pair of commutator brushes for each working coil, each of commutator brushes being slideably mounted for movement along one of said commutator rails, means for conductively connecting each of said commutator brushes to each of said work coils, means for short circuiting the respective ends of said commutator rails, and a pair of conductive substantially parallel capacitor members separated by an insulative layer each of said capacitor members being conformally attached to a portion of said commutator rails to maintain a uniform high potential difference along said portions of the rail, and
  (e) transferring the finished container from said primary turret back to said secondary turret and removing the finished containers from said secondary turret during the second revolutionary cycle of said secondary turret.

* * * * *